INVENTOR.
Robert W. Brackett
ATTORNEY

Oct. 29, 1957 R. W. BRACKETT 2,810,983
ANIMAL TRAP ATTACHMENT
Filed March 5, 1956 2 Sheets-Sheet 2

INVENTOR.
BY Robert W. Brackett
ATTORNEY

2,810,983

ANIMAL TRAP ATTACHMENT

Robert W. Brackett, Northwood, N. H.

Application March 5, 1956, Serial No. 569,434

6 Claims. (Cl. 43—90)

This invention relates to animal traps and, in particular, to an animal trap construction of the class which includes, in addition to the usual spring actuated jaws, a striking mechanism for delivering a secondary impact of relatively great intensity designed to paralyze and instantly kill an animal caught between the spring held jaws.

Various structures of this general nature have been proposed and employed in the art. However, all of these structures, so far as I am aware, have been based on the idea of providing a striker member which is mounted independently of the jaws on some suitable part of a trap frame or base so that the striker member will operate when the jaws close. In all of these independently mounted striker arrangements, as well as traps without any striking mechanism, there are well recognized limitations relating to trap performance and use. In one specific instance, for example, there is a need for both increased holding power of the jaws in a closed position and a greater source of energy to initiate the closing of the jaws while the latter are in a fully opened position but just after the bait pan has been tripped away from its locking tongue. One reason for this is the tendency for traps to stick or become sluggish from being immersed in partly frozen or muddy bodies of water. In some cases, the trap may not operate at all if freezing has progressed far enough and, in other cases, the trap may operate so slowly that it fails to catch the animal.

It is an object of the invention, therefore, to improve animal traps and to devise an animal trap construction of the type in which is included a separate striker member for instantly killing an animal which is caught.

Another object is to devise an animal trap construction which will have increased holding power and a greater source of energy for initiating closing movement of a pair of trap jaws once its locking means has been released, even though immersed in a partly frozen fluid body. Another object is to devise a striking attachment which can be combined with various types of traps of conventional nature. Still further objects are to provide a trap construction which is safe to operate, durable in use and capable of being cheaply made by machine tool operations.

In the course of studying the problems and objectives indicated, I have conceived of a new way of combining a striking mechanism with a pair of holding jaws. Essentially, this combination is based on the novel concept of mounting a striker member directly on one of the holding jaws closely adjacent to that part of the jaw which comes into contact with an engaged portion of an animal's body.

I have discovered that I may support a spring held striker and rod assembly on a trap jaw in such a manner that the jaw not only is capable of closing as it normally does but, in an opened position, this jaw is supplied with a greatly increased source of energy for initiating a closing action. The increase in closing energy enables this jaw to spring upwardly even when partly frozen into a body of water and, moreover, once the jaw reaches a substantially closed position, it exerts a greatly increased holding force. I have further discovered that, by incorporating a spring held striker mechanism directly into a trap jaw in close proximity to the holding portion of the jaw, I may utilize the movement of the jaw as it opens and closes to desirably control the operation of the striker mechanism and to extend and accentuate its striking range and power so as to deliver a paralyzing blow which produces instantaneous death in an animal caught between the jaws.

These and other objects and novel features and objectives may be more fully understood and appreciated from the following description of a preferred embodiment of the invention in which—

Figure 1:
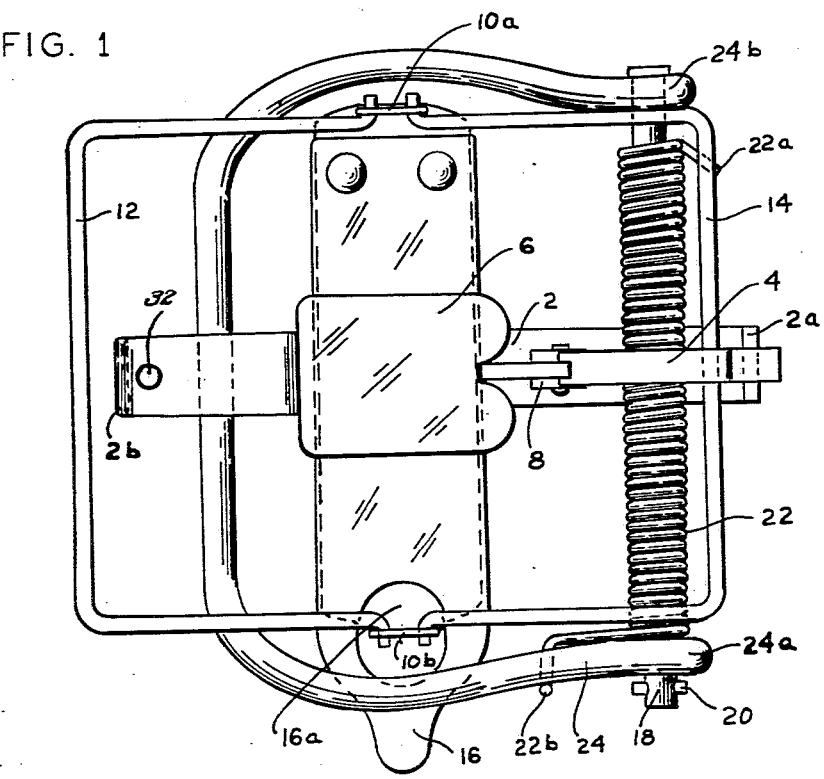
Fig. 1 is a plan view illustrating the animal trap construction of the invention with a pair of holding jaws opened or set in a position to be sprung and with the striking mechanism of the invention also shown in a fully coiled and set position.

In the structure shown in the drawings, numeral 2 denotes a base which preferably forms the bottom section of an animal trap, for example, a trap of the underspring type. It will be understood that this underspring type of trap is used by way of illustration and that the invention is not to be limited to this or any other particular form of trap. As is customary in the underspring type of trap, a locking tongue 4 is pivotally mounted on the extremity 2a of the base 2 and a bait pan 6 is pivotally mounted on an element 8 in a position such that it may engage with the locking tongue 4 when the latter member is located over one of the trap jaws in a fully opened position such as shown in Fig. 1.

Solidly secured to the base 2 is a jaw support plate 10 having jaw support uprights 10a and 10b in which are pivotally received a pair of jaws 12 and 14. These jaws are normally urged into a fully closed position by an underspring 16 having at one end an opening 16a through which may be received adjacent side portions of the jaws 12 and 14 when in a fully closed position.

In accordance with the invention, I combine a striking mechanism with the jaw portion 14 and, as illustrative of one suitable means for accomplishing this, I provide in the jaw 14 at opposite side portions thereof a pair of openings through which extend opposite ends of a rod 18 detachably secured by a pin 20. Around this rod is located a striker element 24 and a coiled spring 22 (Fig. 1). One end, 22a, of the spring 22 is anchored against the jaw 14 and the other end 22b is anchored against the striker element. The striker is preferably mounted on the projecting ends of the rod 18. This striker element 24 may take various shapes but, in one preferred form, may have a U-shaped construction, the two legs of which may be formed with eye portions 24a and 24b for engaging over the ends of the rod 18. The striker is constructed of sufficient width so that it may pass down over the jaw 12 and also jaw support plate 2, as shown in Fig. 1.

Figure 2:
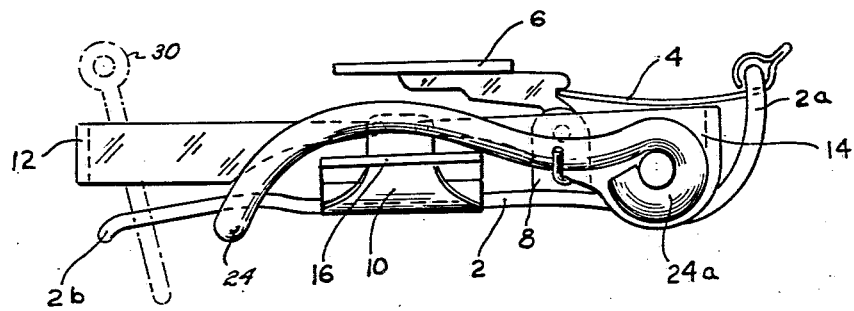
Fig. 2 is a view in side elevation of the structure shown in Fig. 1.
Figure 4:
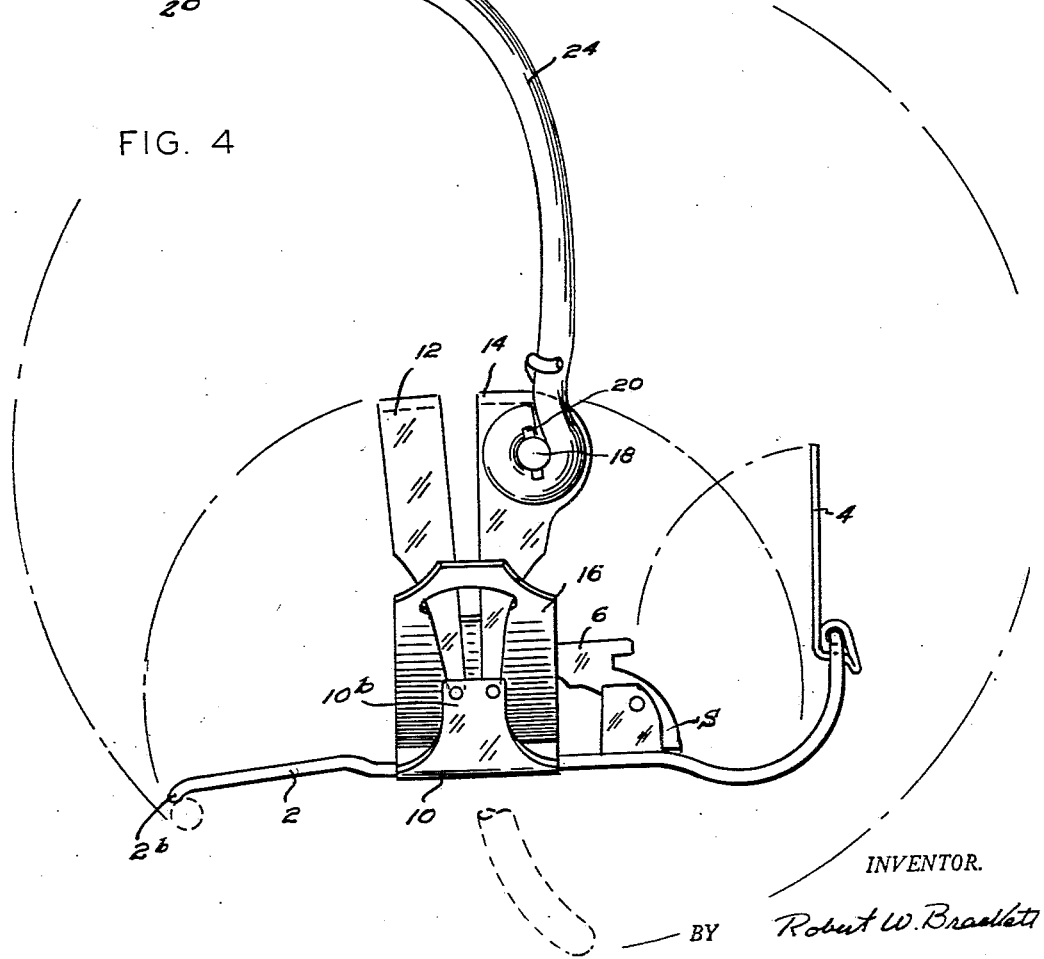
Fig. 4 is still another side elevational view showing the trap with the holding jaws nearly closed and with the striking mechanism fully disengaged and moving through the top of its striking arc.

An important feature of the invention is the construction of this U-shaped member of a sufficient magnitude such that it may readily pass around the jaw 12 in one position of adjustment of the jaws 12 and 14 and also, in another position of adjustment of the jaws 12 and 14, may pass over an end of the base 2. The latter member is constructed with a hooked portion 2b. With the striker member 24 rotated in a counterclockwise direction, as viewed in Fig. 4, and with the jaw 14 in a partly opened position, as shown in Fig. 4, the striker can be brought into engagement with the underside of the member 2. Moving the jaw 14 further into a fully opened or set position, as shown in Figs. 1 and 2, will then draw the striking element 24 into the fully retracted position shown in Figs. 1 and 2. Releasing the jaw 14 permits the striker element to slide outwardly along the underside of the base 2 and at one point to be deflected slightly by the hooked end 2b of the base to impart some delay in disengagement. Thereafter, the striker moves down around and out of engagement with the hooked end 2b and is then recoiled in a clockwise direction to produce a striking blow.

In Fig. 4, I have shown the striker 24 in an intermediate position into which it moves shortly after having been released from engagement with the bar 2 and passing through a striking arc of turning which has been represented in broken lines in Fig. 4. As noted above, the effect of the sliding action of the striker element along the underside of the base is to slightly delay the release of this member to begin its arcuate travel. By forming the end of the base 2 with the hooked end 2b of a predetermined size and curvature, the delayed release of the striker member may be controlled to occur at a slightly later point and this may be desirable to provide for the release of the striker member in a correctly timed relationship with the closing movement of the jaws.

Figure 3:
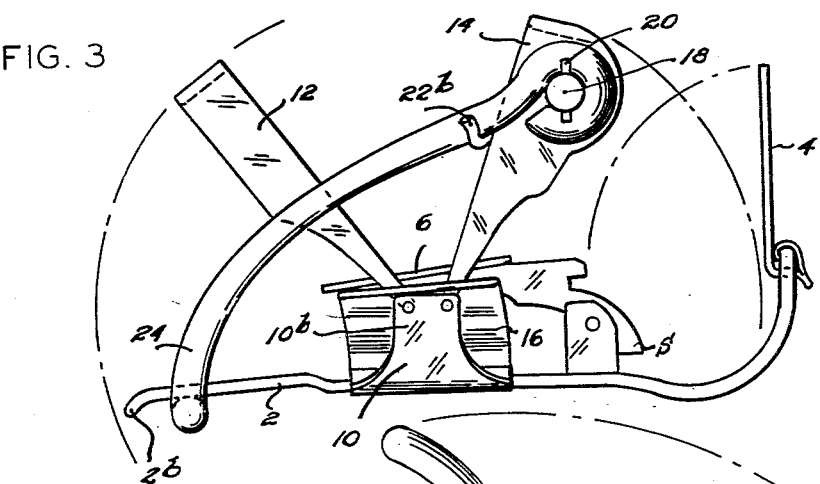
Fig. 3 is a side elevational view showing the trap just after the locking tongue has been disengaged from the bait pan and with the holding jaws in a partly closed position.

In Fig. 3, I have shown the striker engaged under the base 2 and the jaws 12 and 14 are opened into an intermediate position. As the jaw 14 moves downwardly into a fully opened position, as shown in Fig. 1, it will be apparent that the spring 22, which was partly coiled when the member 24 was swung under the base 2, becomes further coiled and is now in a position to exert great tension directly against the jaw 14. It will be seen, therefore, that, immediately upon the bait pan 6 being disengaged from the locking tongue 4, this combination of forces will operate to spring the jaw 14 upwardly with the secondary force acting in addition to the force of the spring 16.

I have found that these combined forces are sufficient to operate the trap even when immersed in a muddy or partly frozen body of water. Moreover, when the trap jaws are in a closed position, as suggested in part by Fig. 4, and assuming that an animal is caught in the jaws of the trap, the striker member will be jammed against the animal's body and, since one end of the spring 22 is anchored against the jaw 14, there will be continuously exerted a very strong holding force tending to prevent the jaw 14 from being forced or pulled apart from the jaw 12.

It will still further be appreciated that, in mounting the striking element 24 on the jaw 14 in the manner disclosed, there is realized an extended range of striking which is based on the arc of rotation of this jaw 14 and it is found that this extended range of striking operates to reach out and engage against an animal at a more vulnerable point on the animal's body such as will produce instant death by shock. Furthermore, the extended range of travel of the striking jaw is found to turn the animal's body over which tends to draw the animal into the closing arc of the jaws 12 and 14.

I may desire to incorporate a spring-loaded striker member of the type disclosed with a trap jaw in various other ways. It will be seen that, by removing the pin 20, I may at any time remove the striker member and its rod and spring components from the jaw. Similarly, I may desire to detachably mount this type of striker element or various other forms of striking means employing detachable clamps, screw fastenings and the like to be combined with this underspring type of trap or various other classes of traps.

In setting the trap, the striking element 24 may be turned from a position such as that shown in Fig. 4 into the position shown in Fig. 3 with the jaws 12 and 14 being partly forced open. A safety pin as 30 may then be passed down through an opening 32 in the base 2 and, in this position, projects into engagement against the striking element 24. This arrangement prevents the striking element from being sprung backwardly while the jaws 12 and 14 are being set. The latter operation is done in the usual manner with the locking tongue being passed over the jaw 14 and engaged with the bait pan 6. Thereafter, the safety pin 30 is withdrawn and the trap is ready to be sprung.

From the foregoing disclosure, it will be evident that I have provided a desirable combination of trap jaws and striker mechanism whereby improved operation may be realized with the striking blow being accomplished by materially increased potential spring energy when the trap is set and by a desirably increased holding pressure when the trap is sprung.

I may also desire to employ means for limiting movement of the pan 6 to prevent this member from being thrown suddenly upwardly as, for example, by the spring 16 when the pan is disengaged from its locking tongue at the time the trap may be sprung. It should be understood that, if the pan is suddenly forced upwardly with a considerable pressure, there may be some possibility of the pan throwing an animal's leg out of the trap.

For dealing with this possibility, I construct the pan with a forwardly projecting extension S constituting a stop which is shaped to engage against the base 2 and limit movement of the pan upwardly beyond a predetermined point and yet release of the jaws is not affected.

It will be understood that the invention may be practiced in various other forms than those disclosed or described in keeping with the scope of the appended claims.

Having thus described my invention, what I claim is:

1. An attachment for an animal trap of the class having spring loaded holding jaws, said attachment including a striker member, means for resiliently supporting the striker member adjacent the top side of one of the jaws, and means for retaining and releasing the striking member.

2. An animal trap construction comprising a pair of holding jaws, means for releasably securing the jaws in an open position, a striker mechanism mounted on one of the jaws, the striker mechanism including a striker member, means for pivotally supporting the striker member, spring means for imparting rotative movement to the striker member in one position of pivotal adjustment, and means for retaining and releasing the striking member.

3. An animal trap structure comprising a base having a portion providing a jaw support plate, a bait pan and locking tongue mounted on the base, a pair of holding jaws pivotally supported on the jaw support plate, a spring member having one end secured to the base and the other end extending upwardly and around the jaws in a position to normally urge the jaws into a closed position, pivot means located through two opposite sides of one of the jaws, said pivot means pivotally supporting a striker member and a spring for actuating said striker and means forming a part of the base for holding the striker member in a locked position when the said jaws are opened and the pan and locking tongue are engaged therewith in locking relationship.

4. A structure as defined in claim 3 in which the striker is located on that jaw which is held by the bait pan and locking tongue.

5. A structure as defined in claim 3, including stop means for limiting movement of the pan when the locking tongue is disengaged.

6. An animal trap structure comprising a pair of holding jaws, means for releasably securing the jaws in an open position, a striker member pivotally secured to one of the jaws, spring means for imparting rotative movement to the striker member in one position of pivotal adjustment, means for retaining and releasing the striking member, said spring means being anchored at one end against a side of the jaw on which the striker is mounted, said spring means being operable to aid in holding the jaws in a closed position.

References Cited in the file of this patent

UNITED STATES PATENTS

| | | |
|---|---|---|
| 1,459,897 | La Valle | June 26, 1923 |
| 2,216,911 | Hannold | Oct. 8, 1940 |